(12) United States Patent
Seacat DeLuca et al.

(10) Patent No.: US 9,940,145 B2
(45) Date of Patent: Apr. 10, 2018

(54) METHOD TO IDENTIFY AND DEFINE APPLICATION AND BROWSER UNIFORM RESOURCE LOCATOR CHAINING

(71) Applicant: International Business Machines Corporation, Armonk, NY (US)

(72) Inventors: Lisa Seacat DeLuca, Baltimore, MD (US); Geetika T. Lakshmanan, Winchester, MA (US); Dana L. Price, Cary, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 14/563,409

(22) Filed: Dec. 8, 2014

(65) Prior Publication Data
US 2016/0162304 A1    Jun. 9, 2016

(51) Int. Cl.
*G06F 9/44*     (2006.01)
*G06F 9/46*     (2006.01)
*G06F 9/445*    (2018.01)

(52) U.S. Cl.
CPC ........ *G06F 9/44505* (2013.01); *G06F 9/4451* (2013.01)

(58) Field of Classification Search
None
See application file for complete search history.

(56) References Cited

U.S. PATENT DOCUMENTS

| | | | |
|---|---|---|---|
| 6,195,679 B1 | 2/2001 | Bauersfeld et al. | |
| 7,512,665 B1 | 3/2009 | Cragun | |
| 7,945,545 B1 * | 5/2011 | Sorkin | G06F 17/30884 707/705 |
| 2003/0098878 A1 | 5/2003 | Conley | |
| 2007/0128899 A1 * | 6/2007 | Mayer | G06F 9/4406 439/152 |
| 2010/0287175 A1 * | 11/2010 | Beaudreau | G06F 17/30864 707/759 |
| 2013/0339896 A1 * | 12/2013 | Shadle | G06F 3/0482 715/777 |

OTHER PUBLICATIONS

"A Mechanism to Allow User to Define Task Specific Action Flow in Browser", May 19, 2014, IP.com, 9 pages.
Federico Viticci "Chaining Multiple Apps Together with Drafts"www.macstories.net/tutorials/chaining-multiple-apps-to-gether-with-drafts/, Macstories, Printed Feb. 10, 2013, 9 pages.
Sam Costello "How iPhone Multitasking Works—and How to Use It", ipod.about.com/od/usingios4/gt/How-Iphone-Multitasking-Works.htm, About, Printed 2014, 5 pages.

* cited by examiner

*Primary Examiner* — Eric C Wai
(74) *Attorney, Agent, or Firm* — Jordan IP Law, LLC

(57) ABSTRACT

Methods and systems may provide a way for a system to anticipate usage patterns and automatically open a chain of application and browser windows based on typical usage. Additionally, a user may manually identify and create the chain of application and browser windows. In one example, application and browser chaining may be correlated with location, time of day, and profile of the user logged into the system.

22 Claims, 4 Drawing Sheets

METHOD TO IDENTIFY AND DEFINE APPLICATION AND BROWSER UNIFORM RESOURCE LOCATOR CHAINING

BACKGROUND

Embodiments of the present invention generally relate to the launching of applications and/or browsers by a user. More particularly, embodiments relate to a method to provide users with a chained application/browser tab launch solution based on application and browser tab launch patterns identified by a system or identified/created manually by the user.

Often when a user is launching applications such as browser windows, there may be a pattern to the typical usage in the sequence of applications launched. To retrieve commonly searched information the user may launch different applications by manually clicking many times. The user may manually enter keywords from one application to another. Bookmarks/shortcuts may be used to save frequently visited applications/sites but the user may be required to manually find and open each of the applications/sites in order to launch them. A considerable amount of time may be expended in manually opening each application individually for commonly searched information.

BRIEF SUMMARY

Embodiments may also include a method of providing to a user logged into a device with a chained application tab launch, comprising identifying an application pattern, creating an application chain using the application pattern, and accessing multiple applications automatically with a single enablement of the application chain.

Embodiments may also include a computer program product comprising a computer readable storage medium and computer usable code stored on the storage medium, where if executed by a processor, the computer usable code may cause a computer to identify an application pattern automatically, create an application chain automatically using the application pattern and access multiple applications automatically in an order identified in the application chain.

Embodiments may include a computer program product comprising a computer readable storage medium and computer usable code stored on the computer readable storage medium, where, if executed by a processor, the computer usable code may cause a computer to identify a browser pattern, respond to input from a user and enable the user to create the bookmark chain by highlighting different tabs with control type action, create a special bookmark type, and access multiple browsers automatically with a single enablement of the browser pattern.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
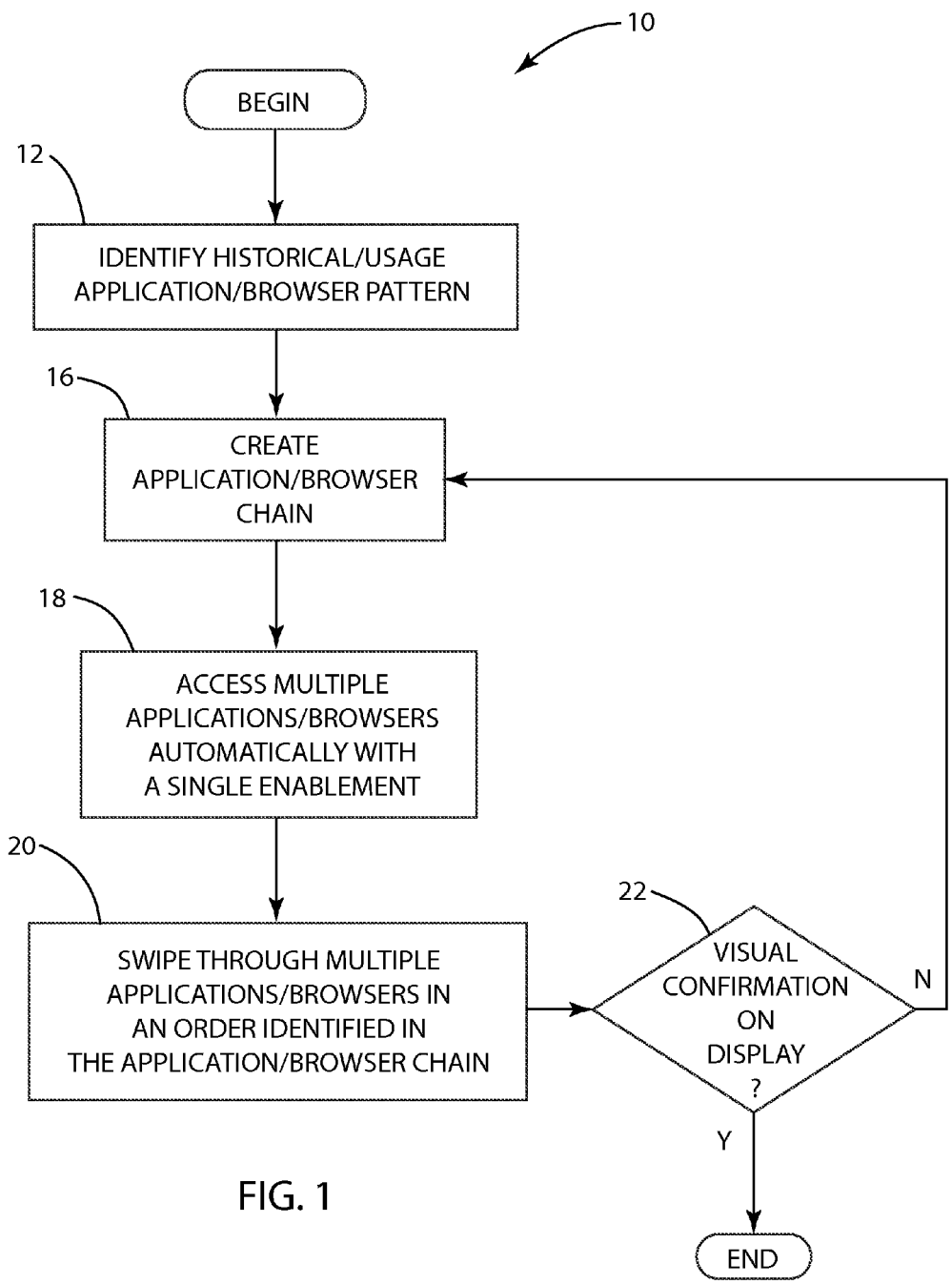
FIG. 1 is a flowchart of an example of a method of forming a chained application tab launch according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring now to FIG. 1, a method 10 of an example of an embodiment is shown wherein a computer system may identify a historical pattern of application (e.g., browser) usage at block 12. When a user launches applications such as, for example, browser windows, there may be a pattern to typical usage in the sequence of applications/browsers launched. A positive response enables the user to manually input an application sequence to create the application chain at block 16. The computer system may automatically create the application chain at block 16 as based on typical, historical usage. The user may also manually create the application chain, if so desired. With the creation of the application chain at block 16, two or more applications/browsers may be accessed with a single enablement by the user. The formation of the application chain enables the user to access multiple applications/browsers within the given application pattern with one click at block 18 on the application chain. While viewing on a display at block 22, the user may be able to swipe through multiple applications at block 20 opened in an order identified within the application chain and data found may be optionally passed through the applications to avoid the need to re-enter information. Alternatively, the swiping may be the addition of a new menu option where the "next" application may be shown as a shortcut within the menu of choices (not shown).

Figure 2:
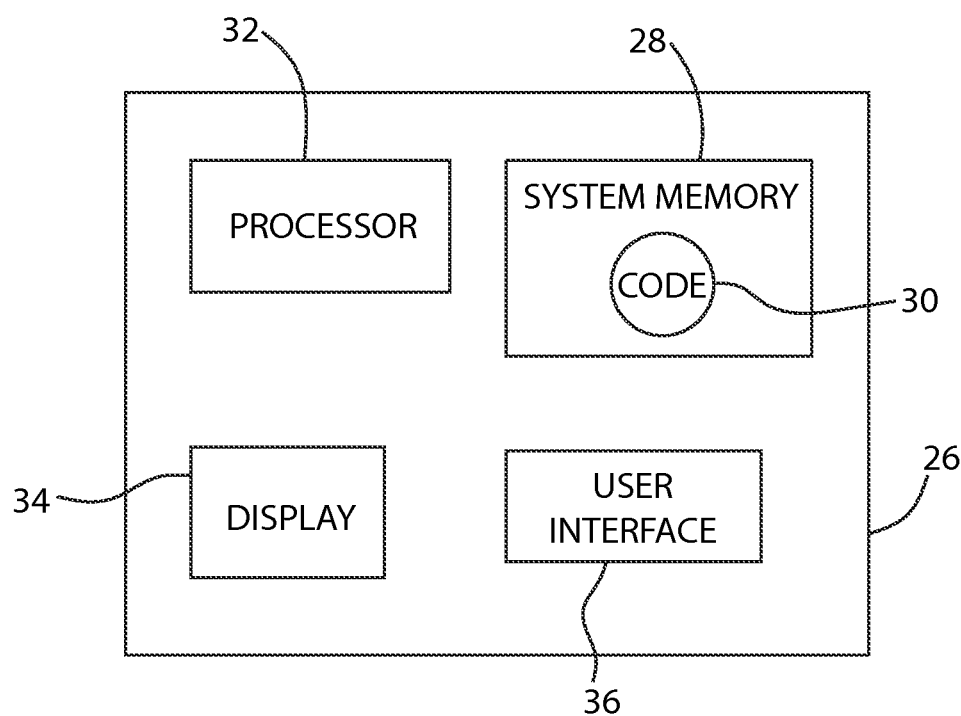
FIG. 2 is a block diagram of an example of a computer program product according to an embodiment.

FIG. 2 describes an example of an embodiment of a computer program product 26 that may use the method 10 outlined in FIG. 1 and includes a non-transitory computer readable storage medium 28 with stored computer usable code 30. A processor 32 within the computer program product 26 may cause the code 30 to identify a historical/usage application pattern automatically, create an application chain automatically using data collected from the application pattern, and access multiple applications/browsers automatically in an order identified in the application chain. The code 30 may cause the computer program product 26 to enable a next application in the application chain as a shortcut. This could be an alternative to swiping as described above in FIG. 1. The code 30 may cause the computer program product 26 to correlate the application pattern using a location, time of day and profile of the user. Thus, the application chain, as customized to the user, may be displayed on a display 34 when the user logs in (interfaces) 36.

Figure 3:
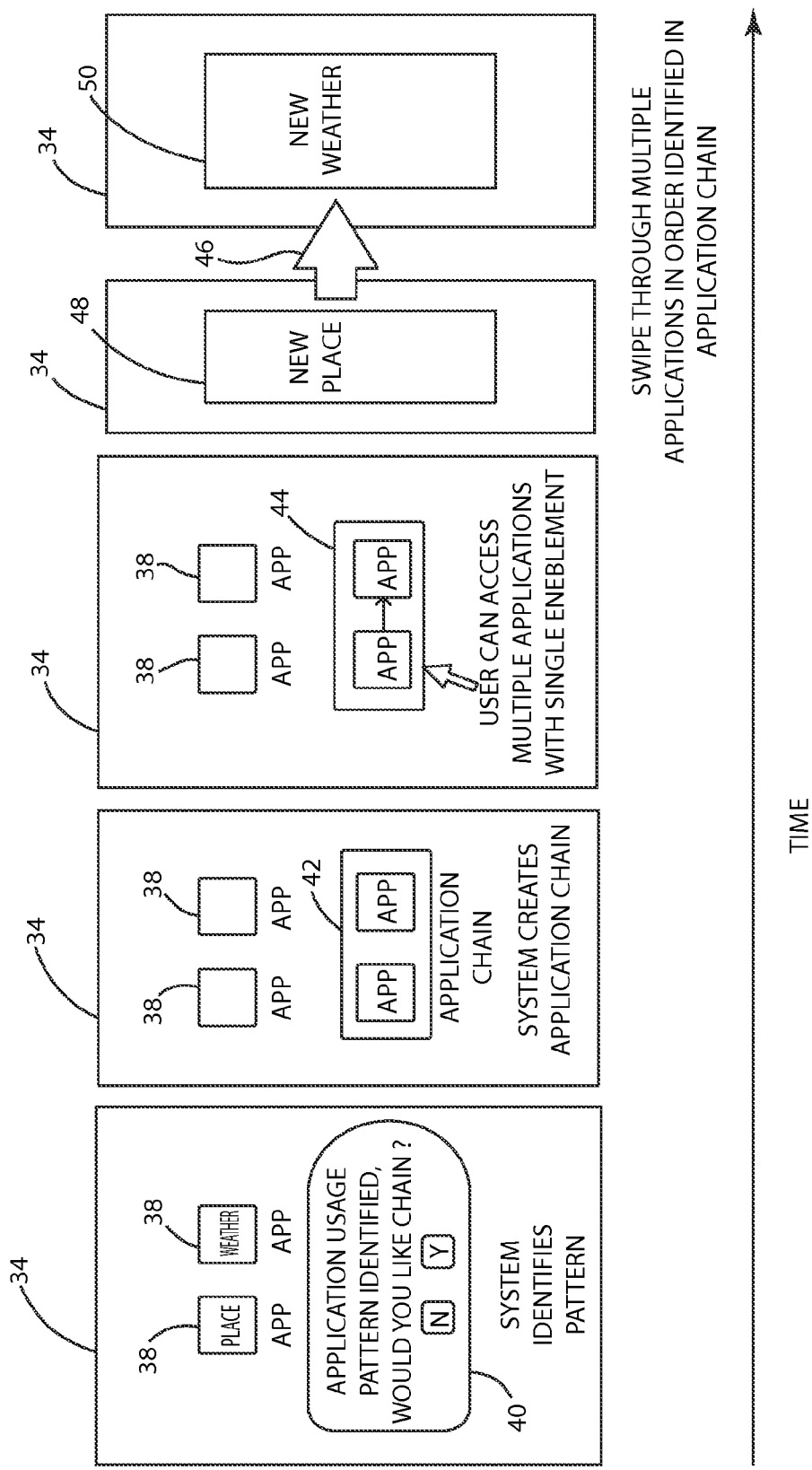
FIG. 3 is a block diagram of an example of a creation of an application chain according to an embodiment.

FIG. 3 shows an example of a creation of an application chain at 42 according to an embodiment. A display 34 may provide visual confirmation to the user of the formation of the application chain at 42 by detecting, for example, a swipe, a click, a button press, a device motion (e.g., shake), etc., or any combination thereof. The user may access applications at 38 historically and create typical usage patterns. A computer system may identify that a pattern may exist and allow the user at 40 to create the application chain at 42 using the applications at 38 (in this example: "place", "weather conditions") in the order accessed by the user. The computer system may automatically incorporate the applications into one application chain at 42 which can be accessed by a single enablement by the user at 44. Thus, the formation of the application chain at 42 may enable the user to access multiple applications with the single enablement at 44. The user may swipe through the applications at 46 opened in the order identified within the application chain at 42 when a new application search is desired. Data found may be optionally passed through the applications to avoid the need to re-enter in formation. In the example of FIG. 3, a request for a "new place" at 48 entered when swiped may enable "new weather conditions" at 50 at the new place at 48. Thus, the user may save time with a reduction in the number of key strokes required in her search. The computer system may anticipate usage patterns and automatically open a chain of applications/URLs based on a typical usage.

Figure 4:
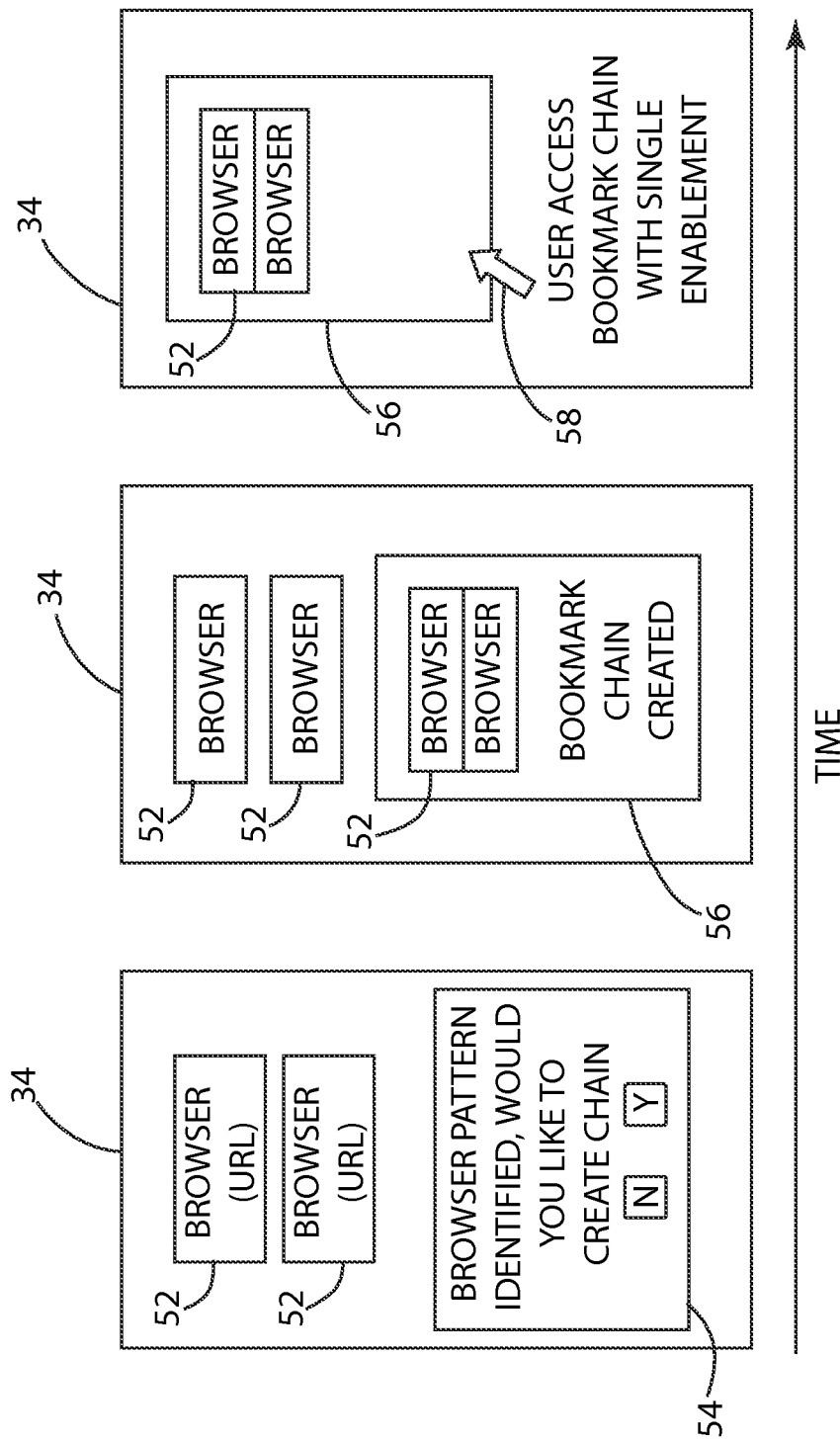
FIG. 4 is a block diagram of an example of a creation of a browser chain according to an embodiment.

FIG. 4 shows an example of a creation of a browser/uniform resource locator (URL) chain at 56 according to an embodiment. Multiple URLs at 52 may be accessed in a specific order. The computer system may allow the user at 54, based on pattern usage, to manually create a URL bookmark chain. The computer system may automatically create the bookmark chain at 56. The bookmark chain at 56 may allow the user to access multiple URLs in the specific order originally entered with a single enablement at 58. Optionally, the user may select and/or create the URL bookmark chain at 56 by highlighting different tabs with control and/or enter type action with an associated special bookmark type (not shown). Fewer manual clicks may be required to retrieve commonly searched information.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method to provide a user logged into a device with a chained application launch, comprising:
    identifying an application pattern;
    creating an application chain using the application pattern; and
    accessing multiple applications automatically with a single enablement of the application chain, wherein the single enablement of the application pattern enables an automatic exchanging of data between one application and another in the application chain,
    wherein one or more applications in the application chain is to be enabled as a shortcut, and
    wherein the application pattern relates to a predetermined order of accessing the multiple applications based on a historical usage of said multiple applications by a user, and wherein said one application and said another application in the application chain are accessed in an order corresponding to the application pattern.

2. The method of claim 1, wherein the application pattern correlates with a location of the user logged into the device.

3. The method of claim 1, wherein the application pattern correlates with a time of day of the user logged into the device.

4. The method of claim 1, wherein the application pattern correlates with a profile of the user logged into the device.

5. The method of claim 1, further comprising visually confirming the application pattern and the application chain on a display in response to one or more of a swipe, a click, a button press or a device motion.

6. The method of claim 1, wherein the user identifies the application pattern manually.

7. The method of claim 1, wherein the user creates the application chain manually.

8. The method of claim 1, wherein a computer program product identifies the application pattern automatically.

9. The method of claim 1, wherein a computer program product creates the application chain automatically.

10. A computer program product, comprising:
    a computer readable storage medium; and
    computer usable code stored on the storage medium, where, if executed by a processor, the computer usable code causes a computer to:
    identify an application pattern automatically;
    create an application chain automatically using the application pattern; and
    access multiple applications automatically in an order identified in the application chain, wherein a single enablement of the application pattern is to enable an automatic exchanging of data between one application and another in the application chain,
    wherein one or more applications in the application chain is to be enabled as a shortcut, and
    wherein the application pattern relates to a predetermined order of accessing the multiple applications based on a historical usage of said multiple applications by a user, and wherein said one application and said another application in the application chain are accessed in an order corresponding to the application pattern.

11. The computer program product of claim 10, wherein the computer usable code, if executed, causes a computer to enable a next application in the application chain as the shortcut.

12. The computer program product of claim 10, wherein the computer usable code, if executed, causes a computer to correlate the application pattern with a location, time of day, and profile of a user logged in.

13. The computer program product of claim 10, wherein the computer usable code, if executed, causes a computer to enable a next application in the application chain in response to a swipe by a user logged in.

14. The computer program product of claim 10, wherein the computer usable code, if executed, causes a computer to enable a display when a user logs in.

15. A computer program product, comprising:
    a computer readable storage medium; and
    computer usable code stored on the computer readable storage medium, where, if executed by a processor, the computer usable code causes a computer to:
    identify a browser pattern;
    respond to input from a user and enable the user to create a bookmark chain by highlighting different tabs with control type action, and create a special bookmark type;
    access multiple browsers automatically with a single enablement of the browser pattern, wherein the single enablement of the bookmark chain enables an automatic exchanging of data among elements of the bookmark chain,
    wherein one or more browsers in the bookmark chain are to be enabled as a shortcut, and
    wherein the browser pattern relates to a predetermined order of accessing the multiple browsers based on a historical usage of said multiple browsers by a user, and wherein said one or more browsers in the bookmark chain are accessed in an order corresponding to the browser pattern.

16. The computer program product of claim 15, wherein the user manually modifies the bookmark chain and alters the browser pattern.

17. The computer program product of claim 15, wherein the computer automatically creates the bookmark chain.

18. The computer program product of claim 15, wherein swiping through the browser chain creates the shortcut.

19. The computer program product of claim 15, wherein an application pattern is also identified and simultaneously processed into a chaining pattern.

20. A device comprising:
- a processor;
- a computer readable storage medium;
- computer usable code stored on the computer readable storage medium, where, if executed by the processor, the computer usable code causes the device to:
- identify a browser pattern;
- respond to input from a user and enable the user to create a bookmark chain by highlighting different tabs with control type action, and create a special bookmark type;
- access multiple browsers automatically with a single enablement of the browser pattern, wherein the single enablement of the bookmark chain enables an automatic exchanging of data among elements of the bookmark chain; and
- a display to visually present the bookmark chain,
- wherein one or more browsers in the bookmark chain are to be enabled as a shortcut, and
- wherein the browser pattern relates to a predetermined order of accessing the multiple browsers based on a historical usage of said multiple browsers by a user, and wherein said one or more browsers in the bookmark chain are accessed in an order corresponding to the browser pattern.

21. The computer program product of claim 20, wherein the user manually modifies the bookmark chain and alters the browser pattern.

22. The computer program product of claim 20, wherein the computer automatically creates the bookmark chain.

* * * * *